Patented Nov. 30, 1948

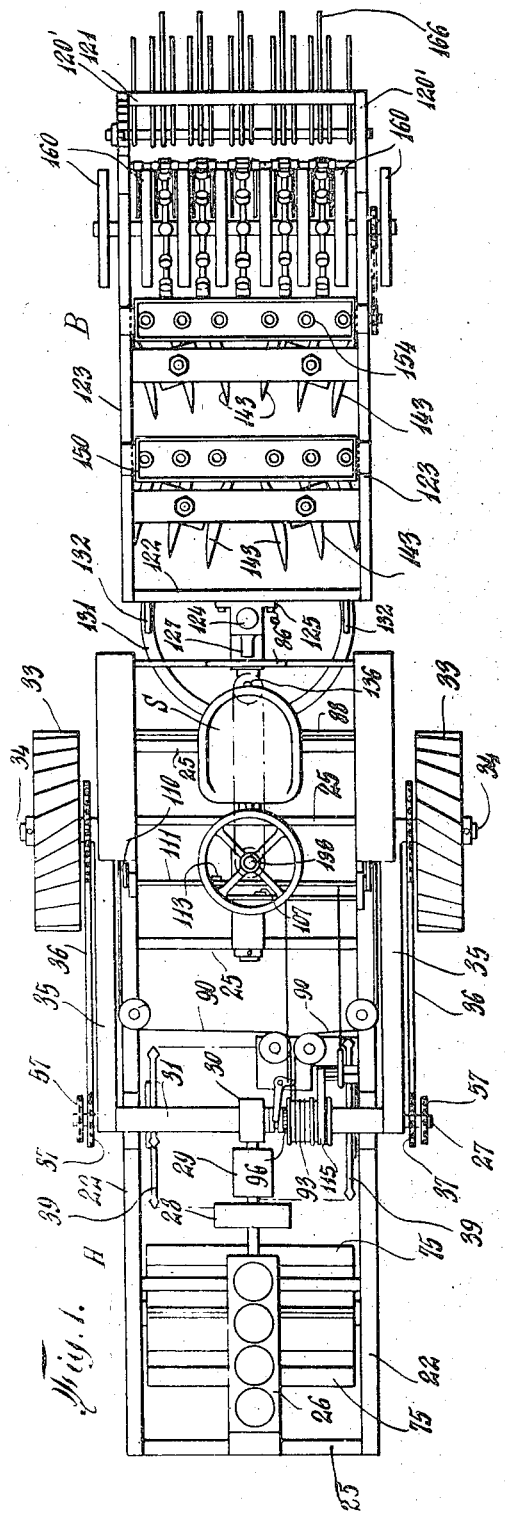

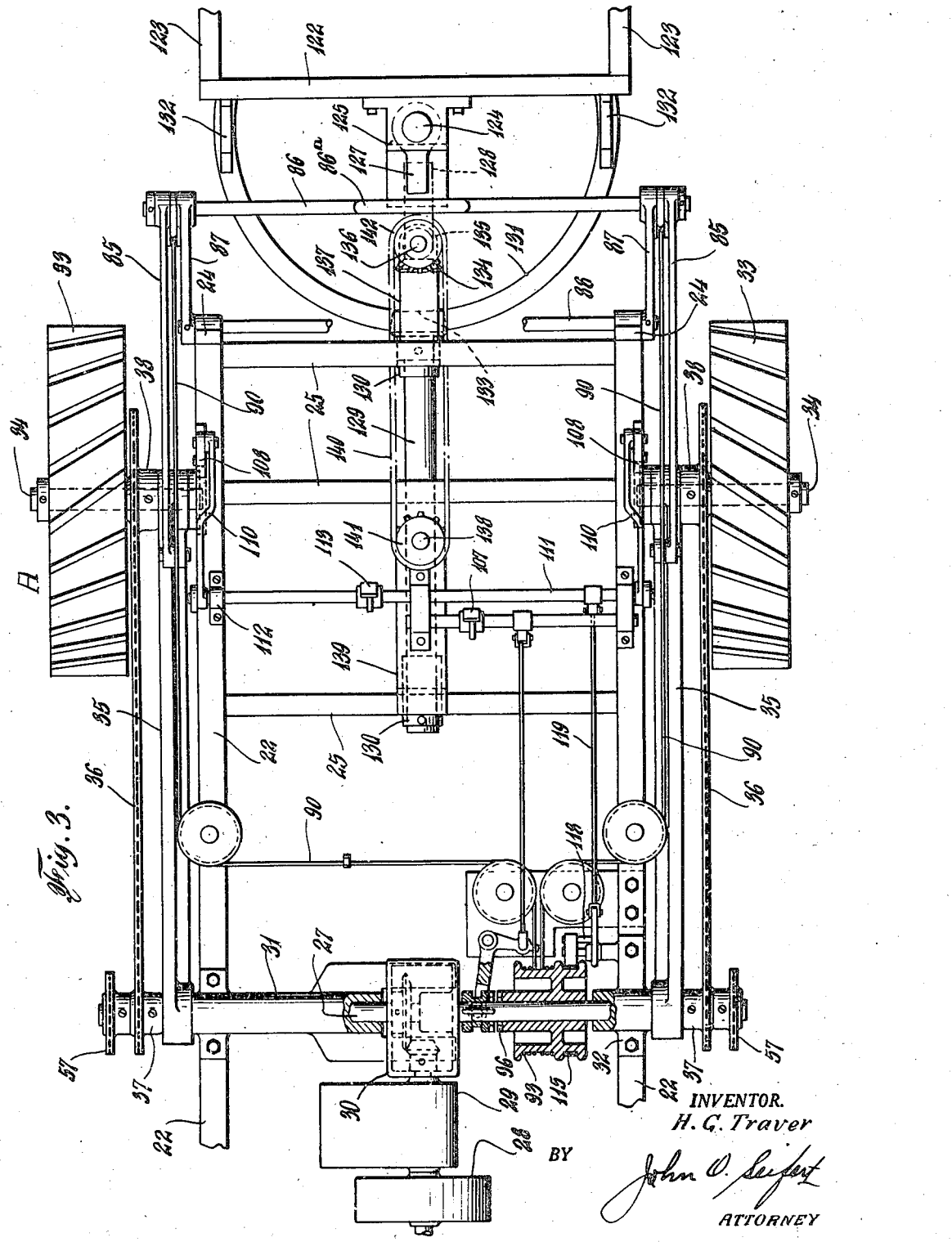

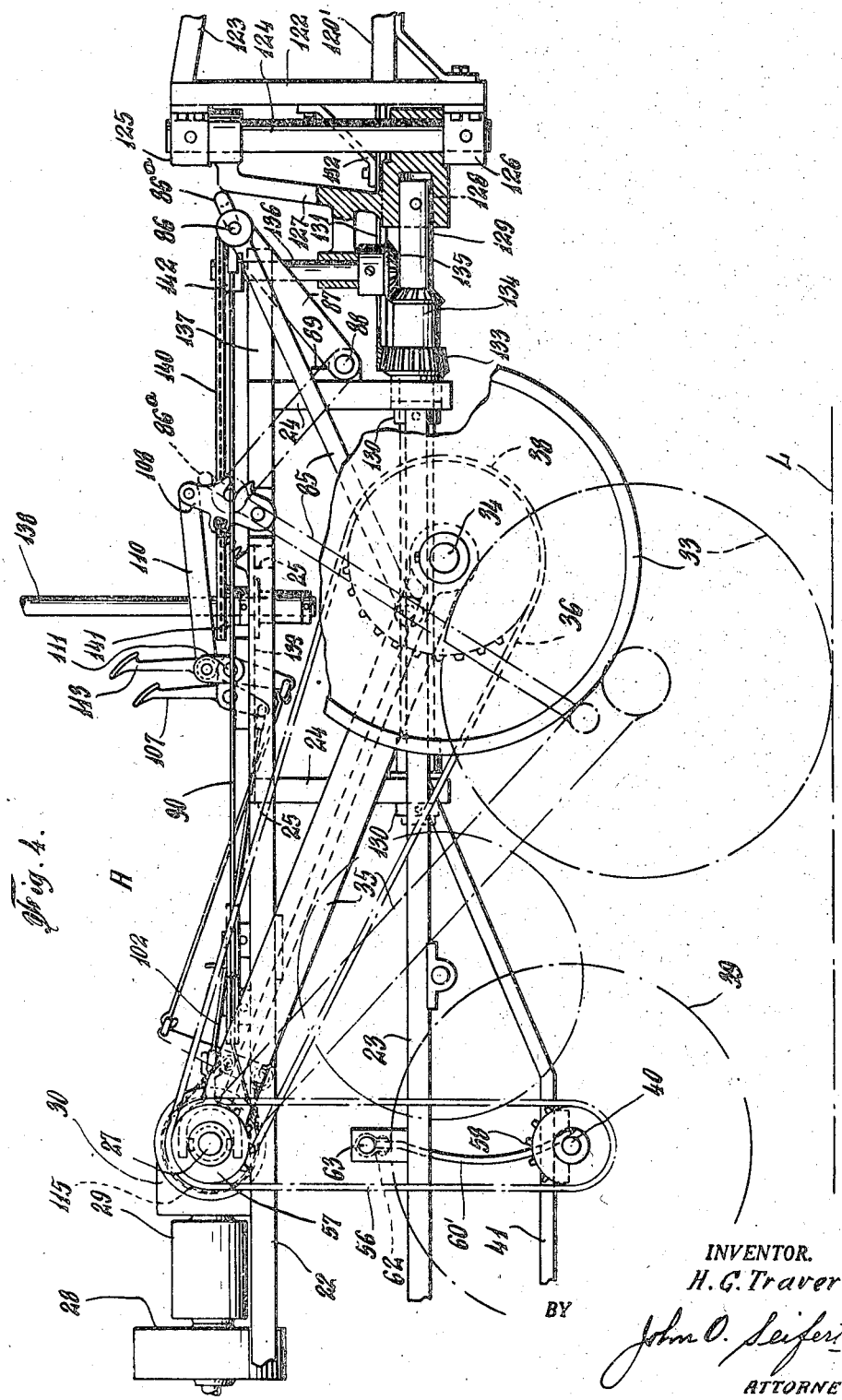

2,455,147

UNITED STATES PATENT OFFICE 2,455,147

MEANS TO CONNECT TRACTOR AND TRAILER SECTIONS AND FOR EFFECTING STEERING THEREOF

Harry G. Traver, Cranford, N. J.

Application March 31, 1944, Serial No. 528,937

4 Claims. (Cl. 280—97)

This invention relates to means to connect tractor and trailer sections arranged with agricultural implements for working and tilling the land and preparing the same for seeding and raising of crops, whereby the sections are adjusted on a vertical axis to effect steering of the sections as a unit.

It is an object of the invention to provide an improved adjustable connection between tractor and trailer sections which is efficient in use and inexpensive to manufacture.

Other objects and advantages of the invention will hereinafter appear.

In the drawings accompanying and forming a part of this application,

Figure 1 is a plan view of connected tractor and trailer sections.

Figure 2 is a side elevational view looking at the bottom of Figure 1.

Figure 3 is a view, on an enlarged scale, of the tractor section, partly in section, showing the connection between the tractor and trailer sections and adjusting means therefor.

Figure 4 is a side elevation of the tractor section looking at the bottom of Figure 3.

The embodiment of the invention illustrated in the drawings for carrying out the invention comprises a tractor section, designated in a general way by A in Figures 1, 2, 3 and 4, and a trailer section, designated in a general way by B in Figures 1 and 2, and said sections pivotally connected to have adjustment one relative to the other on a vertical axis intersecting the longitudinal centers of the sections, as hereinafter fully described.

The tractor section includes a frame consisting of parallelly superposed side members 22, 23, secured in superposed relation by upright members 24 and in lateral spaced relation by transverse members 25. As shown, the tractor section is propelled by power means, shown in a general way as an internal combustion engine at 26 supported upon the transverse members connecting the upper side frame members 22, and said engine operative connected to a drive shaft 27 through a clutch and change speed mechanism, shown in a conventional manner at 28 and 29, respectively. The clutch is provided with the usual means for engaging and disengaging the clutch, and the change speed mechanism is enclosed in a housing and provided with the usual actuating means for operatively connecting different elements thereof to rotate the output shaft at different speeds. The output shaft of the change speed mechanism is connected to the shaft 27 by a bevel pinion fixed on said output shaft meshing with a bevel gear fixed on the drive shaft, said pinion and gear connection being enclosed in a box mounted upon the frame, as shown at 30 in Figure 3. The drive shaft 27 is journaled in the sleeve of a bearing member 31 and a bearing member 32 fixed upon the upper side frame members 22 with the opposite ends of the shaft projecting from opposite sides of the frame.

A pair of traction wheels 33 are connected to the frame to permit of the raising and lowering of the frame and traction wheels relative to each other. For the purpose the traction wheels are loose on one end of shafts 34 carried at one end of a pair of lever arms 35 disposed at the opposite sides of the frame and shown as loosely mounted on drive shaft 27. The traction wheels are rotated from the drive shaft by sprocket chains 36 passing around sprocket wheels 37 fixed on the projecting ends of the drive shaft and sprocket wheels 38 fixed on the traction wheels.

Means to break and loosen the land, shown in dot and dash lines at L, are rotatably carried below the frame forwardly of the traction wheels, and as shown comprises sets of radial digging blades 39 spaced circumferentially about and longitudinally of a shaft 40 extending transversely of and below the frame, and shown as journaled on a sub-frame 41 fixed to and suspended below the lower side members 23 of the frame, as shown in Figures 2 and 4. The shaft 40 is rotated from the drive shaft 27 by sprocket chains 56 passing around sprocket wheels 57 fixed on the ends of the drive shaft 27 and sprocket wheels 58 keyed to the ends of the shaft 40.

To facilitate breaking and loosening of the land by the digger blades 39, said blades are provided with disk cutters 59.

During the digging operation of the digger blades 39 and disk cutters 59 soil and other material will adhere to and accumulate on the digger blades and disk cutters, particularly so if the ground is moist, which may interfere with the efficient operation of the land breaking and loosening means. Means are, therefore, provided to remove from the cutter disks and digger blades any such material adhering thereto. As shown, said means comprises scrapers 60' of curved form in longitudinal section suspended between split clamping collars 62 mounted on a shaft 63 fixed to the side frame members 23 and extending transversely of the frame.

To facilitate breaking and working of stubble land, or land having a cover crop, such as oats, rye or other vegetation to constitute green manure, means are provided to lay such vegetation over the ground and cut the same into relatively small size and thus facilitate not only the breaking of the land but also the mixing of the cut vegetation with the land by the land breaking and loosening action of the digger blades, said means comprising cutter means 75 revoluble in a circular path about a horizontal axis 73.

The tractor frame is adapted to be supported by the wheels 33 with the land breaking and loosening or digging means and vegetation cutter means out of engagement with the land and propelled by the traction wheels, or is adapted to be supported and propelled by the digging means during the digging operation with the wheels out of traction position. For this purpose, the traction wheels are raised and lowered from the drive shaft 27 through links 85 pivotally connected at one to the traction wheel carriers 35 and pivotally engaged at the opposite ends upon the ends of a rod 86 pivotally carried at one end of a pair of arms 87 fixed on the opposite ends of a shaft 88 rotatably supported on the upright members 24. A pair of cables 90 are attached at one end to the rod 86 and the opposite ends of the cables are attached to a drum 93 loose on the drive shaft 27. The drum 93 is coupled to and rotate with the drive shaft 27 through a clutch 96 actuated by a foot actuated lever 107. When the frame is raised to its uppermost position the rod 86 by the forward movement thereof is engaged in a pair of latches 108 pivotally supported at one end to extend upwardly on the upper side members 22 of the tractor frame when the foot actuated clutch lever 107 is released.

To lower the frame to position the land digging means and the vegetation cutting means into engagement with the land and effect raising movement of the traction wheels the holding latches 108 are moved out of engagement with the rod 86 by links 110 pivotally connected at one end to the upper end of the latches and the opposite end of the links pivotally connected to the ends of a shaft 111 rotated to actuate the latches out of engagement with the rod 86 by a foot operated lever 113. To prevent sudden lowering movement of the tractor frame and sudden engagement of the land digging blades with the land and the possibility of breaking the same, brake mechanism 115 is provided on the drum 93 and actuated by lever 113. During the initial movement of the brake pedal 113 the holding latches 108 are moved out of engagement with and release the rod 86 when the weight of the frame will tend to cause it to assume a lowered position.

The trailer section, as shown in Figures 1 and 2, includes a frame substantially of rectangular form comprising side members 120' connected at the rear end by a transverse member 121 and at the forward end by a transverse member 122 which may be a plate extending above and below the side members 120' and members 123 secured at one end to the upper end of the plate 122 and declining to and secured at the opposite end of the side members 120'.

The tractor and trailer sections are pivotally connected to have adjustment one in angular relation to the other on a vertical axis intersecting the longitudinal centers of the sections, and shown as comprising a vertical king pin 124 engaging at the opposite ends in openings in brackets 125, 126 fixed to the upper and lower portions and extending forwardly of the plate 122 and the king pin secured in said brackets by pins extended through the brackets and king pin. The tractor section is pivotally connected to said king pin by vertically spaced and connected bearing members of a bracket 127 pivotally engaged on the king pin within the supporting brackets therefor, and the bracket 127 arranged with a portion forwardly of and in line with the lower bearing member having a socket therein, as at 128, for the engagement of one end of a shaft 129 secured therein and thereby connected to the bracket and trailer section by a pin extending transversely through said bracket portion 128 and the shaft, as shown in Figure 4. The shaft 129 extends through bearing members carried by members 24 of and extending between transverse members 25 of the tractor frame and held against rearward axial movement by collars 130 fixed on said shaft at the front side of said bearing members. By the mounting of the shaft 129 in the bearing members carried by the frame A the frame A is adapted to have independent movement about said shaft, and by the connection of the shaft 129 with the king pin through the bracket or connecting member 127 the frame B is adapted to have independent movement on the longitudinal center of said frame.

To steer the apparatus, the tractor and trailer sections are adjusted in angular relation to each other on the pivotal connection between the king pin 124 and bracket 127. Such adjustment is effected by a sector member 131 fixed to and supported by the plate 122 of the trailer frame to extend forwardly thereof by brackets 132, the undersurface of said sector being arranged with bevel gear teeth which mesh with the teeth of a bevel gear 133 loose on the shaft 129 with one end of said gear abutting the bearing of the shaft 129, and rotative movement of the gear 133 will impart rotative movement to the sector 131 and thereby impart pivotal movement to the forward end of the trailer section and the rear end of the tractor section on the king pin 124 and bracket 127 connection between the frames of said sections. The gear 133 is rotated by a bevel gear 134 connected to or integral with the gear 133 meshing with a bevel gear 135 fixed on the lower end of and rotatable with a vertical shaft 136 rotatably supported in a bracket 137 fixed to the rearmost transverse member 25 connecting the upper side members 22 of the tractor frame midway the ends of said member 25 and extending rearwardly therefrom. The shaft 136 is operatively connected to and rotatable from the rotation of a post 138 having a hand wheel fixed thereto rotatably supported adjacent to and in front of a seat S for an operator of the apparatus in a bearing member of a supporting bracket 139 mounted on and intermediate the transverse members 25 connecting the upper side members 22 of the tractor frame and on which bracket the bearing member for the levers 107 and 113 is also mounted. The rotation of the post is transmitted to the shaft 136 by a sprocket chain 140 passing around a sprocket wheel 141 fixed to the post and a sprocket wheel 142 fixed to the upper end of the shaft 136. In order that the rod 86 will clear the sprocket chain 140 and the upper end of the shaft 136 and sprocket wheel 142 fixed thereon as the rod is moved to and from its rearmost position shown in full lines in Figure 4 the portion of said rod disposed relative to said members is offset laterally, as at 86ª. The trailer carries harrow disks 143 to level and break up the land for a depth of from three to six inches and to finally divide or disintegrate and mix with the land the green manure. The trailer section also carries commercial fertilizer distributing means 150, seeding mechanism 154, soil packing means 160 operative to cover the seed and restore capillarity of the land, and means 166 to effect a final finely separating and levelling of the land.

Having thus described my invention, I claim:

1. In agricultural apparatus, a tractor section, a trailer section, and means to connect the tractor and trailer sections to have pivotal adjustment on a vertical axis and adjust the sections on said vertical axis to effect steering of the apparatus, comprising a king pin carried by the trailer section, a shaft carried by and disposed in the longitudinal center of the tractor section, a bracket fixed on said shaft pivotally engaging the king pin, a pair of beveled gears rotatable in unison on the shaft disposed centrally of the tractor section, a toothed sector fixed on the trailer section meshing with one of said gears, a shaft carried by the tractor section to rotate on a vertical axis having a beveled pinion fixed thereon meshing with the other beveled gear on said first shaft and having a sprocket wheel fixed thereon, a post arranged with a hand wheel rotatably mounted on the tractor section and having a sprocket wheel fixed thereto, and a sprocket chain passing around the sprocket wheels on the post and vertical shaft to transmit the rotation of the post to said shaft and effect rotation of the beveled gears and thereby move the toothed sector fixed to the trailer section and effect adjustment of the tractor and trailer sections in angular relation to each other about the axis of the king pin.

2. In agricultural apparatus, a tractor section, a trailer section, and means to pivotally connect the rear end of the tractor section to the forward end of the trailer section and support said ends of the sections one from the other to have independent adjustment about a vertical axis to effect steering of the apparatus, comprising a king pin mounted in vertical position on one end of and intersecting the longitudinal center of one of said sections, a shaft rotatably carried by and disposed in the longitudinal center of the other of said sections, a member fixed on said shaft pivotally engaging the king pin, a toothed sector fixed on the section carrying the king pin and disposed in angular relation to the king pin, a gear rotatable on said shaft meshing with the teeth of the toothed sector, and means including a hand wheel operative to rotate the gear and move said ends of the tractor and trailer sections one relative to the other about the king pin.

3. In agricultural apparatus, a tractor section, a trailer section, and means to connect the forward end of the trailer section to and support the same from the rear end of the tractor section to have movement one relative to the other about an axis extending longitudinally and centrally of the tractor and trailer sections and about a vertical axis intersecting the longitudinal center of said sections, comprising a king pin carried by one of the sections, a shaft loosely mounted in bearings carried by and disposed in the longitudinal center of the other section, a member fixed on said shaft pivotally engaging the king pin, a gear rotatable on the shaft, and a toothed sector fixed on the section carrying the king pin and disposed in angular relation to the king pin with the sector meshing with the gear, and means operative to rotate said gear and effect movement of the gear and sector relative to each other and adjust the tractor and trailer sections about the king pin.

4. In agricultural apparatus, a tractor section, a trailer section, and means to connect the forward end of the trailer section to and support the same from the rear end of the tractor section whereby the tractor and trailer sections are adapted to have movement one independent of and relative to the other about an axis extending longitudinally and centrally of said frames and about a vertical axis to effect steering of the apparatus, comprising a king pin carried by and disposed perpendicularly to one section, a shaft loosely mounted in bearings carried by and disposed in the longitudinal center of the other section, a member fixed on said shaft and pivotally engaging the king pin, a gear rotatable on the shaft, a toothed sector fixed on the section carrying the king pin with the teeth of the sector meshing with said gear, a manually operable post rotatably mounted on the tractor section, and means to operatively connect and transmit the rotation of the post to the gear and cause the gear to rotate relative to the toothed sector and the sector to move relative to the gear.

HARRY G. TRAVER.

REFERENCES CITED

The following references are of record in the file of this patent:

UNITED STATES PATENTS

| Number | Name | Date |
|---|---|---|
| 688,626 | Friberg | Dec. 10, 1901 |
| 851,026 | Nelson | Apr. 23, 1907 |
| 861,202 | Blue et al. | July 23, 1907 |
| 1,209,084 | Walton | Dec. 19, 1916 |
| 1,255,404 | Gerdeman | Feb. 5, 1918 |
| 1,279,479 | Storm | Sept. 17, 1918 |
| 1,301,043 | Dougherty | Apr. 15, 1919 |
| 1,340,169 | Jessen | May 18, 1920 |
| 1,412,944 | Kletke | Apr. 18, 1922 |
| 1,419,014 | Burtnett | June 6, 1922 |
| 1,611,358 | Miller | Dec. 21, 1926 |
| 1,659,090 | Emmons | Feb. 14, 1928 |
| 2,066,610 | Carlin | Jan. 5, 1937 |